A. H. PARROTT AND H. ROUND.
AIR CUSHION.
APPLICATION FILED NOV. 22, 1919.

1,331,359.

Patented Feb. 17, 1920.

Inventors
A.H.Parrott
H.Round,
By H.R.Kerslake
Attorney

UNITED STATES PATENT OFFICE.

ARTHUR HUGHES PARROTT AND HAROLD ROUND, OF BIRMINGHAM, ENGLAND, ASSIGNORS OF ONE-THIRD TO ROBERT HENRY DAVIS, OF LONDON, ENGLAND.

AIR-CUSHION.

1,331,359.     Specification of Letters Patent.     Patented Feb. 17, 1920.

Application filed November 22, 1919. Serial No. 340,068.

*To all whom it may concern:*

Be it known that we, ARTHUR HUGHES PARROTT, M. D. S., L. D. S., residing at 87 Cornwall street, and HAROLD ROUND, M. D. S., L. D. S., residing at 141 Great Charles street, both in the city of Birmingham, England, have invented certain new and useful Improvements Relating to Air-Cushions, of which the following is a specification.

This invention relates to air cushions adapted for such purposes as the covering of aeroplane and other vehicle parts with which an accupant is likely to collide in the event of an accident. It has been proposed to cover such parts with an air cushion consisting of an inflatable rubber or other tube. Experience proves that such a cushion is practically useless, owing to the fact that the cushion requires a high degree of inflation, and further the resistance which the cushion offers increases with the deformation produced by an impact. A strong reaction is therefore exerted on the colliding body, and the pressure of this reaction is sufficient to cause injury. On aeroplanes, for example, the edge of the fuselage immediately in front of the pilot may be covered with an inflated rubber tube. In the event of an accident the face of the pilot may strike this cushion with great force. At the beginning of the impact the tube may yield readily but the resistance to deformation rapidly increases and in consequence little if any effective protection is given against injury to the pilot's face. The ideal cushion is one which can yield readily without developing the power to rebound, but for practical purposes a cushion must be capable of self-recovery after deformation.

The object of the present invention is to construct an air cushion in which the reaction by which the cushion recovers its shape is relatively small and in which the resistance to deformation may be made practically uniform or graduated as desired.

The invention comprises the use as an air cushion of rubber sponge which is partially inclosed by a non-porous flexible covering and the provision of a restricted air leakage to the atmosphere from the interior of the cushion during compression, restoration of the normal shape after deformation being effected by the natural resiliency of the rubber sponge. In particular the invention comprises the construction of a cushion from a rubber sponge divided into a number of sections and arranged in conjunction with a support in such a manner that escape of air from the interior of the sponge occurs mainly or entirely through the support or rear of the sections.

In the accompanyings sheet of explanatory drawings:—

Figure 1:
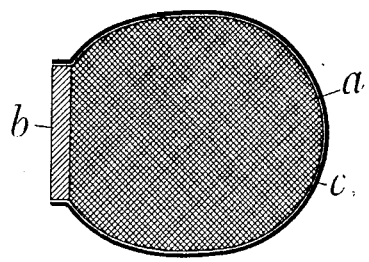
Figure 1 is a diagrammatic cross section of a simple form of cushion constructed in accordance with this invention.

Referring to Fig. 1, a length of sponge rubber $a$ of any convenient cross section is adapted to be mounted on a wood or other support $b$. The rubber portion not in contact with the support is inclosed in an impermeable cover $c$ of American cloth or other suitable fabric. The junction of the covering with the support $b$ is not air tight but can permit restricted leakage of air into and from the rubber. If desired holes may be arranged in the support to provide the necessary air passages. Such a cushion avoids the disadvantages of the inflated cushion and possesses the desired shock absorbing qualities.

Figure 2:
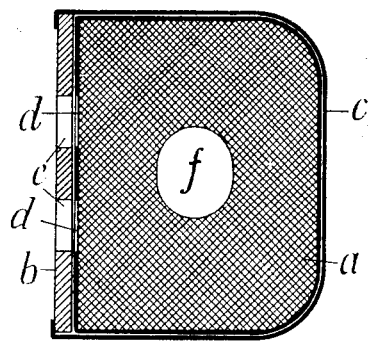
Fig. 2 is a cross section, and Fig. 3 a sectional plan showing diagrammatically a portion of another form of our improved cushion.
Figure 3:
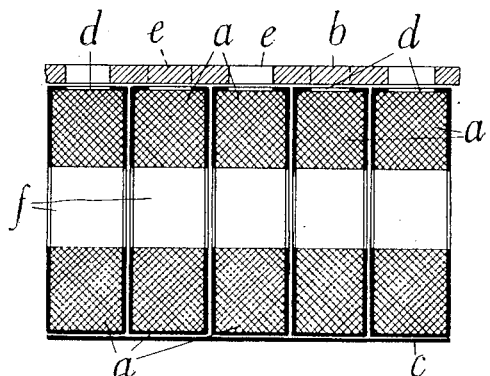

Referring to Figs. 2 and 3, a number of similar sections $a$ of rubber sponge are used. These are normally inclosed in an impermeable membrane of rubber. The parts inclosed by the membrane (which is formed integrally with or is united with the spongy portion) are indicated by thick lines. On the rear side the membrane is perforated at positions as indicated by $d$ to permit escape of air from within the sponge when the section is compressed. If desired the sections may be inclosed in an impermeable or other covering $c$ excepting at the rear where the perforations are required. The sections are mounted on a wood or other support $b$ or directly on the part of the structure to be covered by the cushion, and preferably this support is perforated as at $e$ to permit escape of air from the interior of the cushion. Also one or more central apertures as $f$ may be provided to put the sections in communication with each other. This increases the resiliency of the cushion at the first instant of impact. After the cushion has been partially deformed the central apertures close up and air can then escape only through the rear openings. The cushion may have any width or face, and any cross section, these dimensions being varied to suit different requirements.

The resistance to deformation can be made practically uniform over a large range of the distance through which the cushion can be compressed or it can be graduated as desired. When the impact has ceased the cushion can recover its shape by its natural elasticity, but the force thus brought into action is small as compared with the force of the impact. The stiffness of the cushion (or resistance to deformation) can be varied by suitably modifying the character of the sponge, and the dimensions of the rear and lateral air outlet passages.

The invention is not limited to any particular application, although it is especially adapted for use on aircraft. Neither is the invention limited to any particular constructional details. Thus for example in the sectional form of cushion the cushion may be made in one piece with internal partitions dividing the same into sections, or separate sections may be permanently united.

Having thus described our invention what we claim as new and desire to secure by Letters Patent is:—

1. In air cushions for such purposes as the covering of aeroplane and other vehicle parts with which an occupant is liable to collide in the event of an accident, the combination comprising a main portion of rubber sponge and a non-porous flexible covering for said portion, provision being made for a restricted leakage of air from the sponge portion to atmosphere when pressure is applied to the sponge, substantially as described.

2. In air cushions for such purposes as the covering of aeroplane and other vehicle parts with which an occupant is liable to collide in the event of an accident, the combination comprising a main portion of rubber sponge, a non-porous flexible covering for said portion, a rigid support at the rear of the sponge portion, and air outlet apertures at the rear of the main portion, substantially as described.

3. In air cushions for such purposes as the covering of aeroplane and other vehicle parts with which an occupant is liable to collide in the event of an accident, the combination comprising a plurality of rubber sponge sections arranged side by side, a non-porous flexible covering for said sections, a rigid support at the rear of the sections, and air outlet apertures at the rear of the sections, substantially as described.

4. In air cushions for such purposes as the covering of aeroplane and other vehicle parts with which an occupant is liable to collide in the event of an accident, the combination comprising a plurality of rubber sponge sections arranged side by side and each inclosed by an impermeable membrane formed integrally with the sponge, rear apertures in said sections, a non-porous flexible covering for the sections, a rigid support at the rear of the sections, and air outlet apertures at the rear of the sections, substantially as described.

5. In air cushions for such purposes as the covering of aeroplane and other vehicle parts with which an occupant is liable to collide in the event of an accident, the combination comprising a plurality of rubber sponge sections arranged side by side and each inclosed by an impermeable membrane formed integrally with the sponge, rear and lateral apertures in the sections, a non-porous flexible covering for the sections, a rigid support at the rear of the sections, and air outlet apertures in the support, substantially as described.

In testimony whereof we have signed our names to this specification.

ARTHUR HUGHES PARROTT.
HAROLD ROUND.